United States Patent
Iloglu et al.

(10) Patent No.: US 7,313,605 B2
(45) Date of Patent: Dec. 25, 2007

(54) EXTERNALLY CONTROLLED REACHABILITY IN VIRTUAL PRIVATE NETWORKS

(75) Inventors: Ali Murat Iloglu, Laurence Harbor, NJ (US); Han Q. Nguyen, Marlboro, NJ (US)

(73) Assignee: AT&T Corp., New York, NY (US)

( * ) Notice: Subject to any disclaimer, the term of this patent is extended or adjusted under 35 U.S.C. 154(b) by 741 days.

(21) Appl. No.: 10/768,518

(22) Filed: Jan. 30, 2004

(65) Prior Publication Data
US 2005/0021789 A1 Jan. 27, 2005

Related U.S. Application Data

(60) Provisional application No. 60/481,057, filed on Jul. 3, 2003.

(51) Int. Cl.
*G06F 15/16* (2006.01)
*G06F 15/173* (2006.01)

(52) U.S. Cl. ............... 709/219; 709/227; 709/228; 709/229; 709/238; 709/242; 709/244; 709/249

(58) Field of Classification Search ............ 709/229, 709/219, 227, 228, 238, 242, 244, 249
See application file for complete search history.

(56) References Cited

U.S. PATENT DOCUMENTS 6,532,088 B1 * 3/2003 Dantu et al. ............ 398/43
7,079,499 B1 * 7/2006 Akhtar et al. ............ 370/310
7,120,682 B1 * 10/2006 Salama .................. 709/222
7,185,106 B1 * 2/2007 Moberg et al. ........... 709/238
2002/0002687 A1 * 1/2002 Chantrain et al. ......... 713/201
2002/0061101 A1 5/2002 Hall et al.
2003/0016672 A1 * 1/2003 Rosen et al. ............. 370/392
2003/0079043 A1 * 4/2003 Chang et al. ............ 709/249
2004/0208122 A1 * 10/2004 McDysan ............... 370/230
2004/0255028 A1 * 12/2004 Chu et al. ............... 709/227

FOREIGN PATENT DOCUMENTS

| EP | 1093255 A | 4/2001 |
|---|---|---|
| EP | 1 168 718 A | 1/2002 |
| WO | WO 98/59467 A | 12/1998 |
| WO | WO 01/16766 A | 3/2001 |

OTHER PUBLICATIONS

Bhagavathula, R., et al., "Mobile IP and Virtual Private Networks", BTC 2002—Fall, 2002, IEEE 56yh Vehicular Technology Conference Proceedings, IEEE, US vol. 1 of 4, 2002.

* cited by examiner

*Primary Examiner*—David Wiley
*Assistant Examiner*—Kishin G. Belani
(74) *Attorney, Agent, or Firm*—Henry Brendzel

(57) ABSTRACT

A network that supports VPNs is enhanced to allow users in one VPN to communicate with users in another VPN in the course of executing a predefined application, such as VoIP. This capability is achieved dynamically by enabling a device that can communicate with the network elements that operate to normally prohibit inter-VPN communication to direct those network elements to enable such communication, at least for the purposes the purposes of specific applications.

3 Claims, 2 Drawing Sheets

EXTERNALLY CONTROLLED REACHABILITY IN VIRTUAL PRIVATE NETWORKS

RELATED APPLICATIONS

This application is related to provisional application No. 60/481,057, filed Jul. 3, 2003, which is hereby incorporated by reference.

BACKGROUND OF THE INVENTION

This invention relates to virtual private networks (VPNs) and, more particularly, to the provision of temporary access for predetermined applications across VPNs.

Consider a network operated by a Provider (or a cooperating set of Providers) that includes routers, and Provider Edge (PE) routers through which the provider connects to customer sites. More particularly, customers connect to PEs through Customer Edge (CE) devices, where a CE device can be a host, a switch, or a router to which numerous customer systems (for example, PCs) can be connected. Consider further that any number of subsets can be created from the set of sites, and the following rule is established: two sites may have IP interconnectivity through the network only if both of the two sites belong to some given one of those subsets. Each of the subsets thus created forms a virtual private network (VPN), which is defined, effectively, by the fact that only members that belong to a common VPN can communicate with each other.

One known arrangement that accommodates VPNs is the MPLS (multi-protocol label switching) network. A description of the network is found in E. Rosen and Y. Rekhter, titled "BGP/MPLS VPNs," Internet Engineering Task Force (IETF), RFC2547, March 1999, http://www.faqs.org/rfcs/rfc2547.html, which is incorporated herein by reference.

It is precisely the defining attribute of VPNs—that of not allowing two systems to intercommunicate unless they both belong to some common VPN—that presents a problem for some applications, where it is desirable to allow systems to communicate without regard to VPNs. One such application, illustratively, is voice over IP (VoIP), where, much like in the PSTN environment, it is desirable to allow any system A to communicate with any other system B, even if system B does not belong to any VPN to which system A belongs.

The conventional solution to this problem is to send packets to a PSTN gateway, "hop-off" to the PSTN, and re-enter the network at a gateway with which the destination site is willing to communicate. This assumes, of course that the VPNs are willing to accept packets from the PSTN. Another solution is to use special crossover routers, but that represents an expense.

SUMMARY OF THE INVENTION

An advance in the art is realized in a network that supports VPNs, for example a multi-protocol label-switched network (MPLS), by allowing users in one VPN to communicate with users in another VPN in the course of executing a predefined application, such as VoIP. This capability is achieved dynamically by enabling a device that can communicate with the network elements that operate to normally prohibit inter-VPN communication to direct those network elements to enable such communication, at least for the purposes of the desired application. In the case of an MPLS network that supports VPNs and in the case the desired application being VoIP, the aforementioned device may be a combination of a route server and a call control element, and the aforementioned network elements are the edge routers of the MPLS network's provider, with edge routers' associated VRF (Virtual Routing Forwarding) tables.

DETAILED DESCRIPTION

Figure 1:
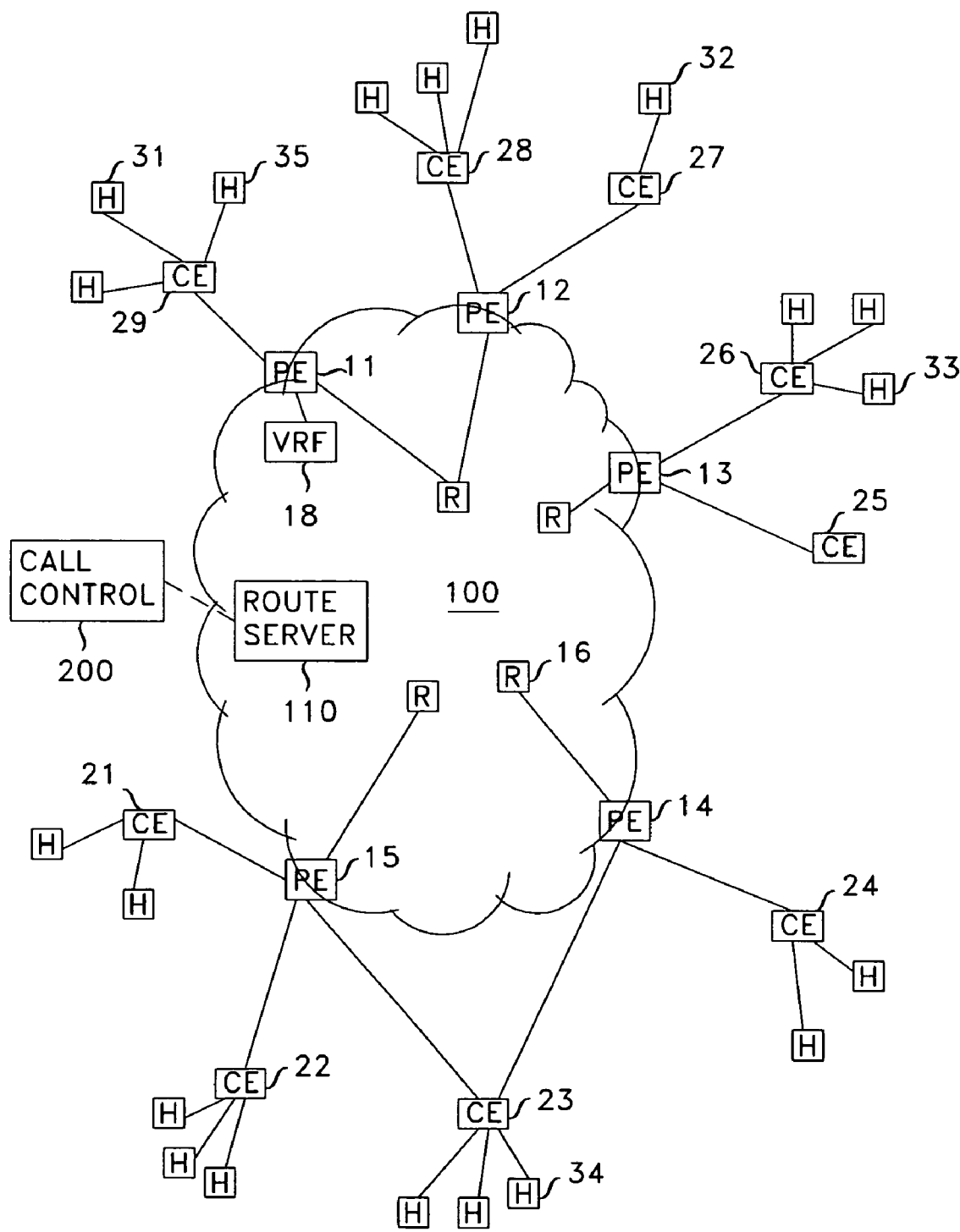
FIG. 1 depicts a network in conformance with the principles disclosed herein.

FIG. 1 illustrates a network 100 that is adapted for provisioning VPNs. It includes edge routers 11 through 15 (marked "PE" for "Provider Edge" router) and internal (non-edge) routers, R, such as the one labeled 16. Each PE is connected to one or more devices outside the network, and for purposes of this exposition, each of those devices is termed a Customer Edge device, or CE device. Thus, CE 29 is connected to PE 11, CEs 28 and 27 are connected to PE 12, CEs 26 and 25 are connected to PE 13, CEs 24 and 23 are connected to PE 14, and CEs 23, 22 and 21 are connected to PE 15. It may be noted that, in addition to more than one CE being connected to a given PE, the FIG. 1 arrangement includes a CE being connected to more than one PE (CE23 being connected to PEs 14 and 15).

A CE device can be simply a host or a personal computer (for example, CE 25), but when it serves to couple numerous systems to network 100, which typically happens when the systems all belong to a single commercial enterprise, the CE is a switch, or a router. FIG. 1 depicts numerous systems (blocks marked "H"), such as element 31, that are connected to various ones of CE's. These systems may be hosts, workstations, personal computers, etc.

Not all of the CE's have to belong to a VPN, but for sake of simplicity the exposition below assumes that they do. Illustratively, CEs 29, 27, 26, 25 and 24 belong to VPN A, CEs 28 23, and 21 belong to VPN B, and CEs 22 and 23 belong to VPN C. It may be noted that not each and every one of the systems that is coupled to CE's 23 must belongs to both VPN B and C; only that at least one of the systems so belongs, for example system 34 (which, for example, has the IP address 101.200.031.155).

Implementation of the VPN concept in the MPLS network 100 is carried out with the aid of a routing and forwarding (VRF) table that is associated with each PE. For sake of clarity, FIG. 1 explicitly shows only one VRF table, 18. The others are subsumed within the respective PEs.

The aforementioned RFC2547 describes in fair detail the process for creating the VRF tables in the context of MPLS networks, and a reader who is interested in those details is invited to read the this RFC and the documents that are referenced therein. For purposes of this invention, however, suffice it to say that, in order to implement the VPN functionality, each PE may include a VRF table not unlike Table 1, depicted below, that contains at least a Source-System ID, a Destination ID, and a Route ID. The table shows a few entries of VRF 18, where, for example, system 31 has the IP address 137.072:152.011, system 35 has the IP address 137.072.152.012, system 32 has the IP address of 143.001.101.100, and system 33 has the IP address of 201.123.122.002.

TABLE 1

| Source ID | Destination ID | Route |
|---|---|---|
| 137.072.152.011 | 143.001.101.100 | RT1 |
| 137.072.152.011 | 201.123.122.002 | RT2 |
| (137.072.152.011) | (other destinations) | (other routes) |
| 137.072.152.012 | 143.001.101.100 | RT1' |
| 137.072.152.012 | 201.123.122.002 | RT2' |
| (137.072.152.012) | (other destinations) | (other routes) |
| (other sources) | (other destinations) | (other routes) |

What Table 1 specifies is that when a packet arrives at PE 11, the packet's source address and destination address are examined. If a row entry in VRF table 18 is found that corresponds to this tuple then the route is identified and used for routing and forwarding the packet. Otherwise, the packet is discarded. For example, if system 31 (IP address 137.072.152.011) sends a packet to PE 11 that is destined to system 33 (IP address 201.123.122.002), the second row of the table is selected, route RT2 is identified, and packet is forwarded. If, however, system 31 sends a packet to PE 11 that is destined to system 34 (IP address 101.200.031.155), no corresponding row in VRF table 18 is found, so the packet is discarded. A different set of routes (RT1' and RT2') is shown for a different system that is connected to CE 29, but typically the same set of routes would be employed (i.e., RT1'=RT1 and RT2'=RT2).

The FIG. 1 arrangement also includes route server 110 within network 100 that communicates with the PEs, and with call control element 200. In accord with the instant embodiment of this invention, one function of elements 110 and 200 is to provide the ability to make inter-VPN connections for particular applications, in spite of the general prohibition against inter-VPN connections. Illustratively, elements 200 and 110 cooperate to allow VoIP connectivity over network 100.

As an aside, the table above does not explicitly show it, but all VRF tables include entries for the IP address of elements 200 and 110, so that packets that are destined to these elements are forwarded. Alternatively, these entries might be in a second, default, VRF table that might also implement permission to reach predetermined gateways that allow systems that belong to a VPN to nevertheless connect to the public Internet, albeit under the watchful processing of the gateway.

Figure 2:
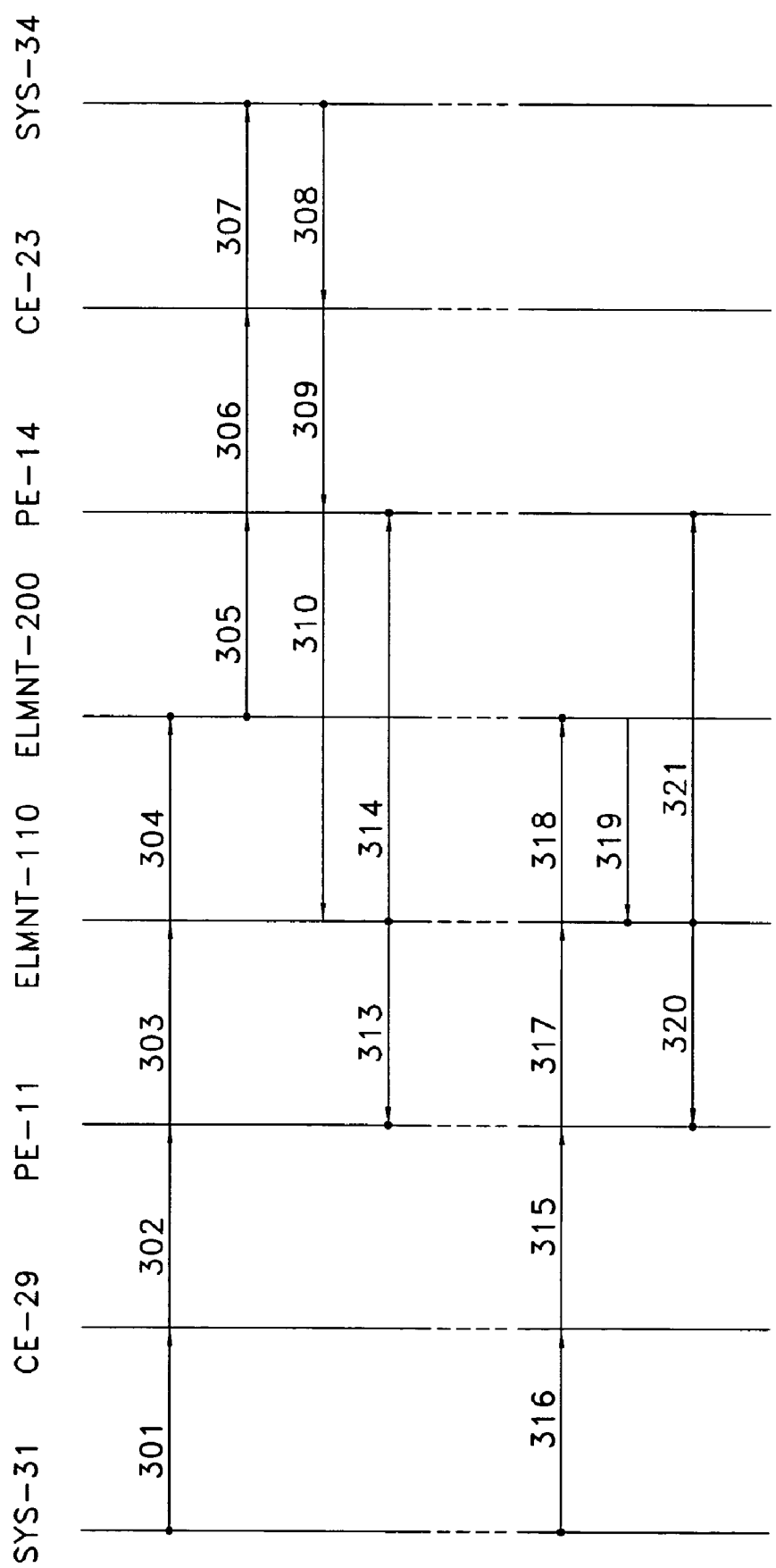
FIG. 2 shows the flow of messages that allow inter-VPN communication for particular applications.

FIG. 2 presents a diagram that presents one embodiment that comports with the principles disclosed herein where, illustratively, system 31 wishes to place a VoIP call to system 34. Presumably, system 31 knows the party at system 34 by other than an IP address, for example, a telephone number. Therefore, when it initiates the VoIP application, it specifies the telephone number of the intended called party. Responsively, the application sends a predetermined call initiation packet 301 that is addressed to call control element 200. This packet specifies its own IP address and its VPN ID, and specifies the telephone number of the called party with which communication is sought to be established. This packet (301) is forwarded to call control element 200 via CE 29 (302), PE 11 (303), element 110 (304), where first the application is examined.

In the illustrative case, the application is a VoIP and, it is assumed, that call control element 200 investigates and concludes that a connection is to be permitted. A connection might be declined if the application is not one that is acceptable to call control element 200, or if either the calling or the called parties are such that a connection ought to be declined.

Once it is concluded that a connection ought to be allowed, a database is consulted to identify the IP address of the called party. Element 200 thus obtains the IP address of system 34 (101.200.031.155) and sends a query packet (306) to the obtained IP address 101.200.031.155 via PE 14 (306) and CE 23 (307). The query packet requests the assigned VPN ID of the called party system. A response packet (308) is launched toward element 200, traveling via CE 23 (309) PE 12 (310), and element 110. Element 110 captures the VPN ID identified in the response packet, as well as the called party's IP address and IP address of PE 14.

The packet arriving at element 110 from the calling party (303) is also perused to identify the calling party's IP address, VPN ID and IP address of PE 11 and, therefore at this point, element 110 has all of the necessary calling party and called party information to enable element 110 to choose a route for packets emanating from system 31 that are destined to system 34 (route X), and a route for packets emanating from system 34 that are destined to system 31 (route Y). Having chosen the necessary routes, element 110 sends a message (313) to PE 11 directing it to install in VRF table 18 the entry shown in Table 2.

TABLE 2

| Source ID | Destination ID | Route |
|---|---|---|
| 137.072.152.011 | 101.200.031.155 | X |

Similarly, element 110 sends a message (314) to the VRF table of PE 14 directing it to install the entry shown in Table 3.

TABLE 3

| Source ID | Destination ID | Route |
|---|---|---|
| 101.200.031.155 | 137.072.152.011 | Y |

After the relevant PEs have their associated VRF tables modified, communication can proceed between systems 31 and 34 even though the two systems belong to different VPNs.

One has to alert system 34 of the incoming call, system 34 has to effectively "go off hook," that information needs to be communicated to system 31, etc. All of these processes are part of the conventional VoIP protocol, which forms no part of this invention. Therefore, these protocols are discussed no further herein. It is presumed, however, that communication does get established and maintained for the duration of the call.

Once the user of system 31 (or the user of system 34) terminates the VoIP application, a message is sent to element 200 by the party that terminated the communication (315, 315, 317, 318), informing the element 200 that the communication terminates. In response, element 200 sends a message (319) to element 110 informing it that the ability of terminals 31 and 34 to intercommunicate may be removed. In turn, element 110 sends a message to PE 11 (320) and to PE 14 (321) directing them to remove the VRF entries that were previously inserted.

It may be noted that once the entries described above are inserted into the VRF tables, any and all communication can be conducted between terminals 31 and 34. It is expected, however, that situations may exist where that is undesirable. Allowing an employee at, for example, AT&T, to use VoIP communication with an employee of, for example, Sprint, does not necessarily mean that data communication between them should be allowed. This loophole can be blocked by simply adding a column to the VRF table that specifies a particular flow, port, or other attribute of the established VoIP communication. Packets that possess the specified attribute are forwarded, while other packets are blocked.

The above disclosed the principles of this invention by describing one illustrative embodiment, but it should be realized that other embodiment that are somewhat different from the above description may still be encompassed by the this invention, as defined by the accompanying claims. For example, the invention is not limited to MPLS networks, is not limited to using a combination of a route server and a call control element to overcome the prohibition against inter-VPN communication, and is not limited to the VoIP application (or any other real-time application such as Video over IP). For instance, communication may be permitted pursuant to any particularly specified application to which both of the entities that established the affected VPNs agree. Also, there is no requirement to remove the ability for two systems to intercommunicate as disclosed above as soon the underlying application terminates. Applications can exist where traffic load is reduced by maintaining such an ability, once established, for some preselected time. Also, the above uses source address in the VRF table, but it may be noted that IP traffic that is associated with a particular VPN employs a particular physical or logical connection between CE and PE routers. Therefore, the source address column of the VRF tables ca can, in such applications, be replaced by a "connection" column. Of course, additional elements may also be included, such as firewalls, etc.

The invention claimed is:

1. A method executed in an arrangement including a network that supports assigning systems to specified VPNs, which systems connect to edge routers of the network, which network includes collection, comprising one or more devices, that operates to insure that systems A and B of said systems that are each assigned to one or more VPNs but which have no commonly assigned VPN cannot communicate with each other, comprising the steps of:

receiving a message from an application for which inter-VPN communication is allowed, indicating a desire to establish communication between said systems A and B;

directing said collection to install a modification whose effect is to allow communication between said systems A and B; and directing said collection to remove said modification at a later time to reinstate prohibition against communication between said systems A and B;

where said directing said collection to install a modification comprises a step of installing an entry in a VPN route and forward (VRF) table that is associated with edge router A of edge routes through which said System A is coupled to said network, and installing an entry in a VRF table that is associated with edge router B of edge routes through which said system B is coupled to said network; and where said entry that is installed in said VRF associated with said edge router A comprises an indication that system B belongs to a VPN to which system A belongs, and said entry that is installed in said VRF associated with said edge router B comprises an indication that system A belongs to a VPN to which system B belongs.

2. The method of claim 1 where said entry that is installed in said VRF associated with said edge router A further comprises a route indication for reaching system B, and said entry that is installed in said VRF associated with said edge router B further comprises a route indication for reaching system A.

3. The method of claim 1 where said entry that is installed in said VRF associated with said edge router A further comprises a route criterion for limiting traffic that is destined to system B solely to traffic that pertains to said application.

* * * * *